United States Patent

Weiler et al.

Patent Number: 5,458,344
Date of Patent: Oct. 17, 1995

[54] DUST COVER FOR THE BRAKE CYLINDER OF A DISC BRAKE

[75] Inventors: Rolf Weiler, Eppstein; Uwe Bach, Niedernhausen-Oberjosbach; Horst Lenzner, Schattdorf, all of Germany

[73] Assignee: ITT Automotive Europe GmbH, Germany

[21] Appl. No.: 196,115

[22] PCT Filed: Aug. 21, 1992

[86] PCT No.: PCT/EP92/01921

§ 371 Date: Jun. 15, 1994

§ 102(e) Date: Jun. 15, 1994

[87] PCT Pub. No.: WO93/04297

PCT Pub. Date: Mar. 4, 1993

[30] Foreign Application Priority Data

Aug. 22, 1991 [DE] Germany .......................... 41 27 830.5

[51] Int. Cl.⁶ .............................. B61F 15/22; F16J 9/08
[52] U.S. Cl. .............................................. 277/212 FB
[58] Field of Search ............... 277/235 R, 237 A, 277/DIG. 4, 212 FB, 227, DIG. 6, 212 C

[56] References Cited

U.S. PATENT DOCUMENTS

| | | | |
|---|---|---|---|
| 3,191,950 | 6/1965 | Hiltner | 277/235 |
| 3,197,217 | 7/1965 | Mastrobattista et al. | 277/235 |
| 3,285,547 | 11/1966 | Henry | 277/227 |
| 4,220,418 | 9/1980 | Kondo et al. | 277/212 FB |
| 4,270,442 | 6/1981 | Bainard et al. | 277/DIG. 4 |
| 4,852,891 | 8/1989 | Sugiura et al. | 277/212 FB |

FOREIGN PATENT DOCUMENTS 0366505 of 0000 European Pat. Off. .

OTHER PUBLICATIONS

International Search Report for PCT/EP92/01921.
International Preliminary Examination Report for PCT/EP92/01921.

Primary Examiner—William A. Cuchlinski, Jr.
Assistant Examiner—Keith Hwang
Attorney, Agent, or Firm—Dykema Gossett

[57] ABSTRACT

In a dust cover (6) for the brake cylinder (1) of a disc brake with a ring-shaped boot (7), with a fixing torus (8) at a first end of the boot engaging an annular groove (9) in the piston (3) of the brake cylinder (1) and with a stiffening lining in the shape of a ring (11) which is at least partly surrounded by the material of the boot (7) and which urges the second end of the boot (7) against the inside wall (12) of a ring-shaped recess (5) in the front side (4) of the brake cylinder (1) said second end of the boot (7) forms a unilaterally open, ring-shaped bag into which said ring (11) is inserted. Within said bag the ring (11) is formed with perforations (14) which are penetrated by the material of the boot (7). A radial collar (13) of the ring (11) which projects out of said bag constitutes a surface of abutment for an assembly tool.

9 Claims, 4 Drawing Sheets

DUST COVER FOR THE BRAKE CYLINDER OF A DISC BRAKE

TECHNICAL FIELD

The invention relates to a dust cover for the brake cylinder, and more particularly relates to dust covers for brake cylinders of disk brakes having a ring-shaped boot, with a fixing torus at a first end of the boot which engages an annular groove in the piston of the brake cylinder and with a stiffening lining in the shape of a ring which is at least partly surrounded by the material of the boot and which urges the second end of the boot against the wall of a ring-shaped recess in the front side of the brake cylinder.

BACKGROUND OF THE INVENTION

A dust cover of the kind indicated is known from the European patent application 0 366 505. In this dust cover, the stiffening lining is completely embedded in the elastomeric material of the boot and united to the elastomeric material by vulcanization. This technique involves a comparatively expensive manufacturing process and is difficult to automate the dust cover because the assembly tools cannot support the boot directly at the stiffening element.

An object of the invention is to create a dust cover which can be manufactured in a particularly inexpensive way and which is suited for an automatic assembly.

SUMMARY OF THE INVENTION

According to the invention this object is achieved in that the second end of the boot forms a unilaterally open, ring-shaped bag into which the ring is inserted, in that the ring is formed with perforations within the bag which are penetrated by the material of the boot, and in that a rim of the ring projecting from the bag is furnished with an abutment surface.

In the inventive dust cover, an adhesive connection between the elastomeric material of the boot and the inserted ring is eliminated. This is due to the penetration of the material of the boot into the perforations of the ring creating a positive lock which firmly ties together both constructional elements. Due to this circumstance, the ring can be coated with the boot material without requiring an adhesive. This allows considerable reduction of the manufacturing costs. In addition, the materials of the ring and of the boot can be selected without considering their adhesion behavior. For example, the ring may be made of stainless steel or of thermoplastic synthetic material. For the manufacture of the boot, rubberlike materials and elastomeric plastic materials may be used. Because of the configuration of a bag for accommodating the ring, a good seal is assured between the second end of the boot and the brake cylinder. This is assured because the wall of the boot is not interrupted from the point of clamping between the ring and the inner wall of the recess of the brake cylinder up to the fixing torus which embraces the piston. A sealed connection by cementing the inserted ring to the material of the boot is, therefore, not necessary. For improving the sealing properties, the outer surface of the ring-shaped bag (which is abutted against the wall of the recess of the brake cylinder) may be formed with a sealing bead or with a sealing lip.

The rim of the ring projecting from the bag allows the dust cover to be supported by one assembly tool, this, in turn, allows the dust cover to be mounted automatically. The required pressing-in force is, in this event, transmitted by the positive locking engagement between the ring and the boot. The limit of the pressing-in stroke can be effected during assembly either at the assembly tool or the rim of the ring jutting out of the bag may have a radial collar which allows it to be urged in axial direction against an abutment surface at the brake cylinder. The accommodation in an assembly tool, too, will be facilitated by a radial collar.

In another embodiment of the inventive dust cover, the rim of the ring projecting out of the bag may engage a wall of the recess within the brake cylinder in order (by direct frictional contact with the brake cylinder) to secure the second end of the boot to the brake cylinder. In this conjunction, the rim of the ring may be bent over in radial direction and be interrupted by cutouts which are disposed at a distance from one another in order to increase the elasticity of the rim. The wall of the bag facing away from the boot is formed with a sealing bead being abuttable against the wall of the recess in radial direction and another sealing bead abuts the wall in an axial direction.

A preferred process for the manufacture of the inventive dust cover involves using an injection mould for the shaping the boot, and coating the ring with elastomeric material. The bag is created in this instance by the presence of the ring in the injection mould.

DETAILED DESCRIPTION OF THE PREFERRED EMBODIMENTS

Figure 1:
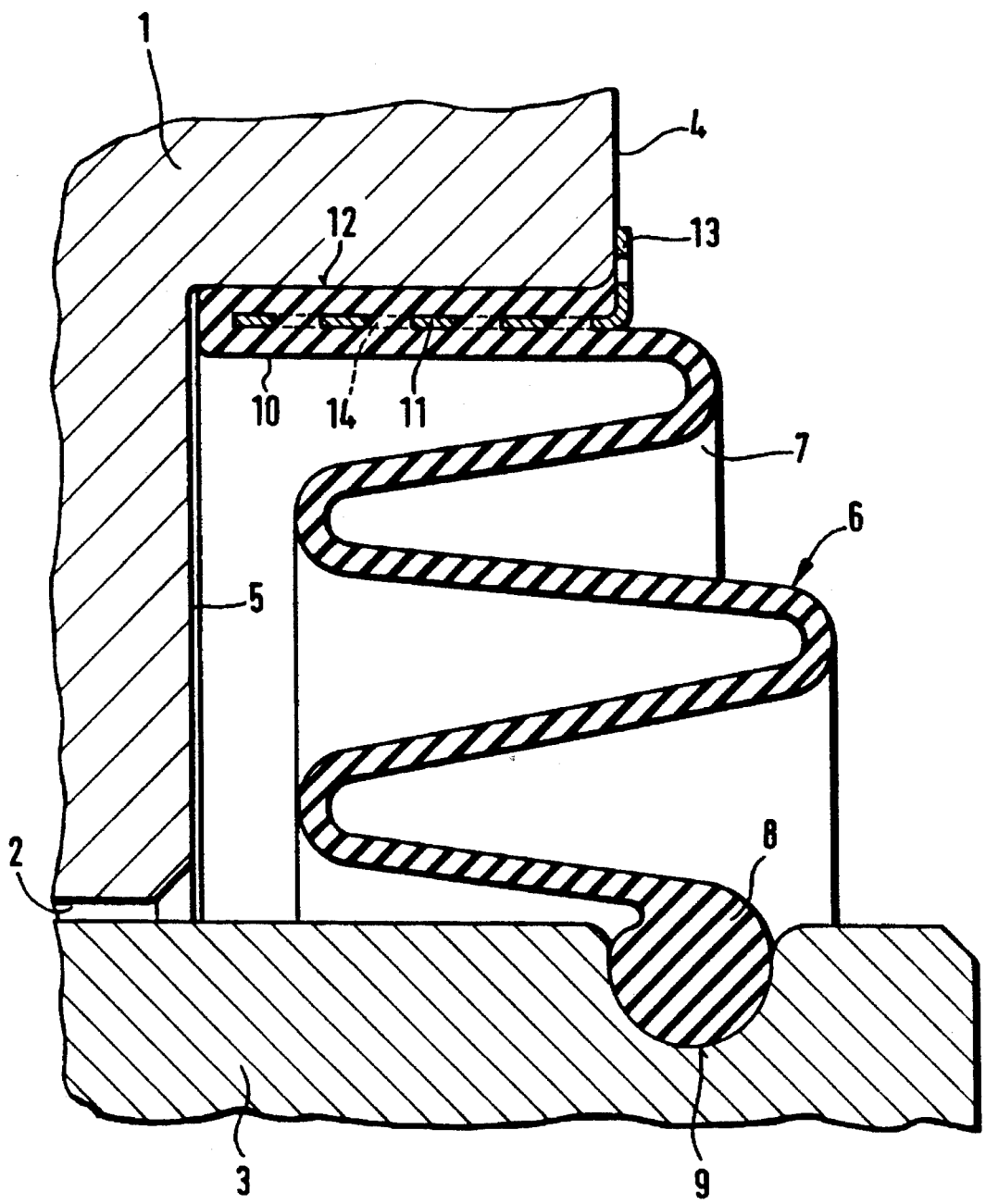
FIG. 1 shows a cross-section through the range of the brake cylinder of a disc brake which is sealed off by a first design version of the inventive dust cover of the present invention.

The cross-sectional representation according to FIG. 1 shows the open end of a cylinder 1 of a disc brake with a piston 3 projecting from the cylinder bore 2. In the front side 4 of the brake cylinder 1 a ring-shaped recess 5 is provided in which a dust cover 6 is positioned. The dust cover 6 is comprised of a boot 7 with a plurality of folds which surrounds the piston 3 in a ring-shaped manner and which at its radially internal end is buttoned with a fixing torus 8 into an annular groove 9 in the piston 3. The radially external end 10 of the boot 7 is stiffened by a cylindrical ring 11 of stainless steel plate and is urged by said ring 11 with its outer surface tightly against the cylindrical inside wall 12 of the recess 5. The ring 11 is embedded into a unilaterally open bag which is formed by the end 10 of the boot 7 and projects with a radially outwardly bent collar 13 out of said bag. The collar 13 provides a surface for an assembly tool for the automatic assembly of the end 10 of the dust cover 6 and additionally constitutes a stop for interacting with the front side 4 of the brake cylinder 1 and for limiting the pushing-in depth of the end 10.

In order to unite the ring 11 to the bag being formed by the end 10, said ring 11 is inserted into an injection mould during the fabrication of the boot 7 and coated with the elastomeric boot material. Since, in this instance, a sufficient adhesive connection between said ring 11 and the boot material is not always achieved, the ring 11 is preferably formed with perforations 14 in the shape of circular holes into which the boot material penetrates during the injection moulding operation in order to cause a positive locking union between the ring 11 and the end 10. Due to this positive locking union, the shearing forces which occur during the pressing-in of the end 10 into the recess 5 are transmitted, so that said end 10 allows to be urged through the ring 11 into the illustrated position of incorporation without the risk of a damage of the bag being formed by said end 10. The described dust cover 6, thus, allows reliable, automated assembly through the ring 11 and allows tight connection to the brake cylinder 1.

Figure 2:
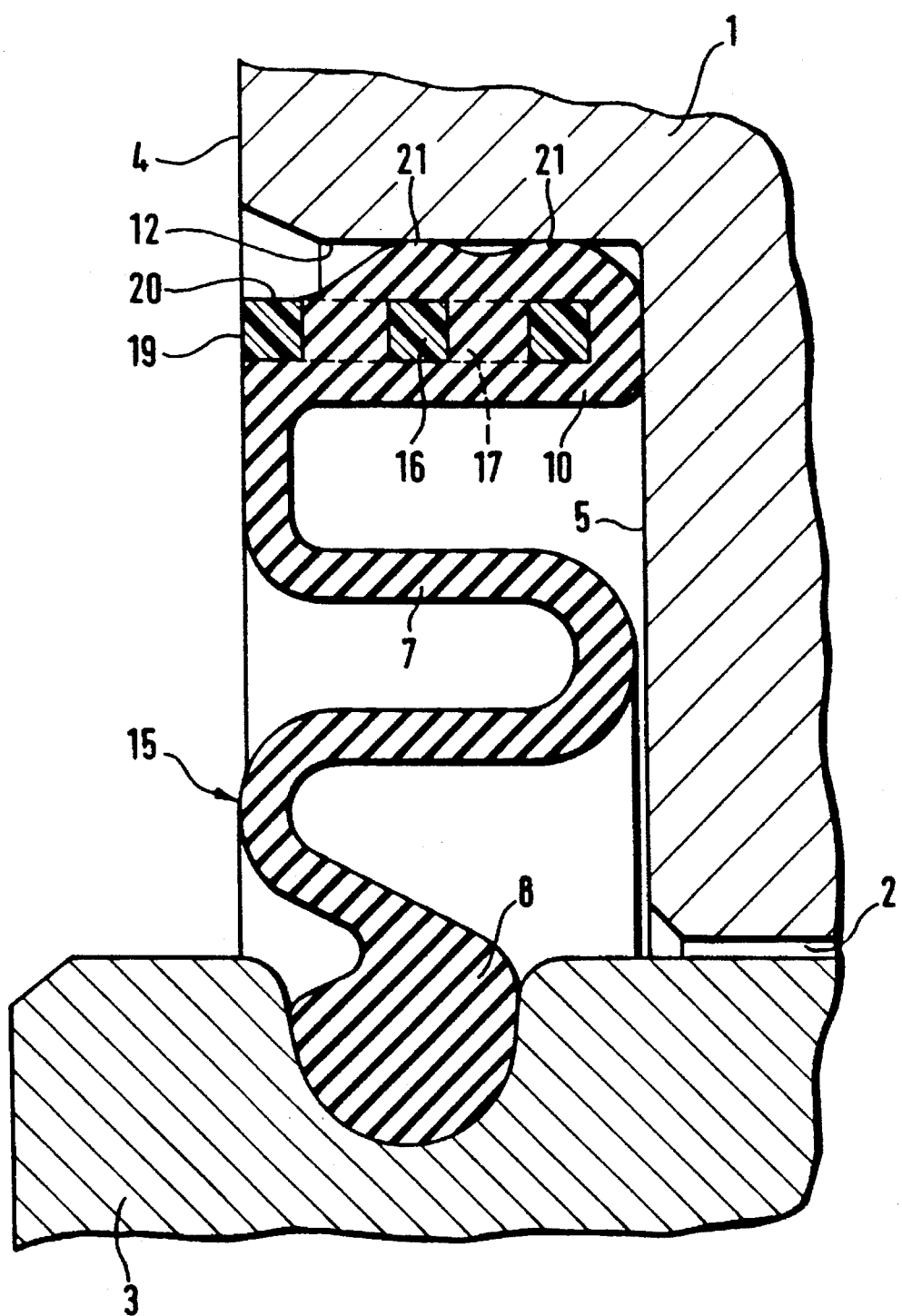
FIG. 2 shows a cross-section through the range of a brake cylinder of a disc brake which is sealed off by a second design version of the inventive dust cover of the present invention.
Figure 3:
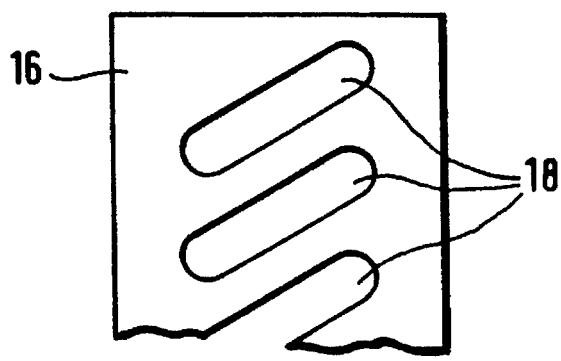
FIGS. 3 to 5 show partial views of various design versions of stiffening rings for dust covers in accordance with the invention of FIG. 2.
Figure 4:
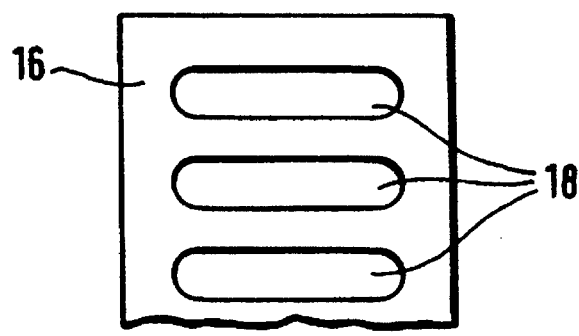
Figure 5:
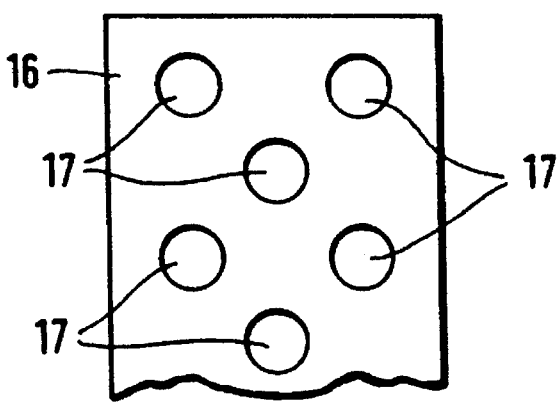

In the design version of a dust cover 15 which is illustrated in FIG. 2, the radially external end 10 of the boot 7 is stiffened by a ring 16 made of thermoplastic synthetic material. Said ring 16 is formed with perforations in the shape of circular openings 17 as are represented in FIG. 5. The size of said openings 17 corresponds to the flow properties of the rubber material of which the boot 7 is made. In lieu of said openings 17, the ring 16 may be furnished with slots 18 in accordance with the arrangements shown in FIGS. 3 and 4. In this embodiment, too, the ring 16 is coated with the rubber material of the boot 7. Both the front side 19 facing away from the recess 5 and the radially external surface of rim 20 are freely exposed and form a surface of application for an assembly tool by means of which the dust cover 15 can be automatically inserted into the recess 5. The depth of incorporation is preferably determined in this instance, by the abutment of the assembly tool against the front side 4 of the brake cylinder 1. The section of the end 10 surrounding the ring 16 from outside is furnished with two sealing beads 21 in order to attain a good sealing of the end 10 of the dust cover 15 with respect to the inside wall 12 of the brake cylinder 1 without elevated radially directed forces of deformation.

Figure 6:
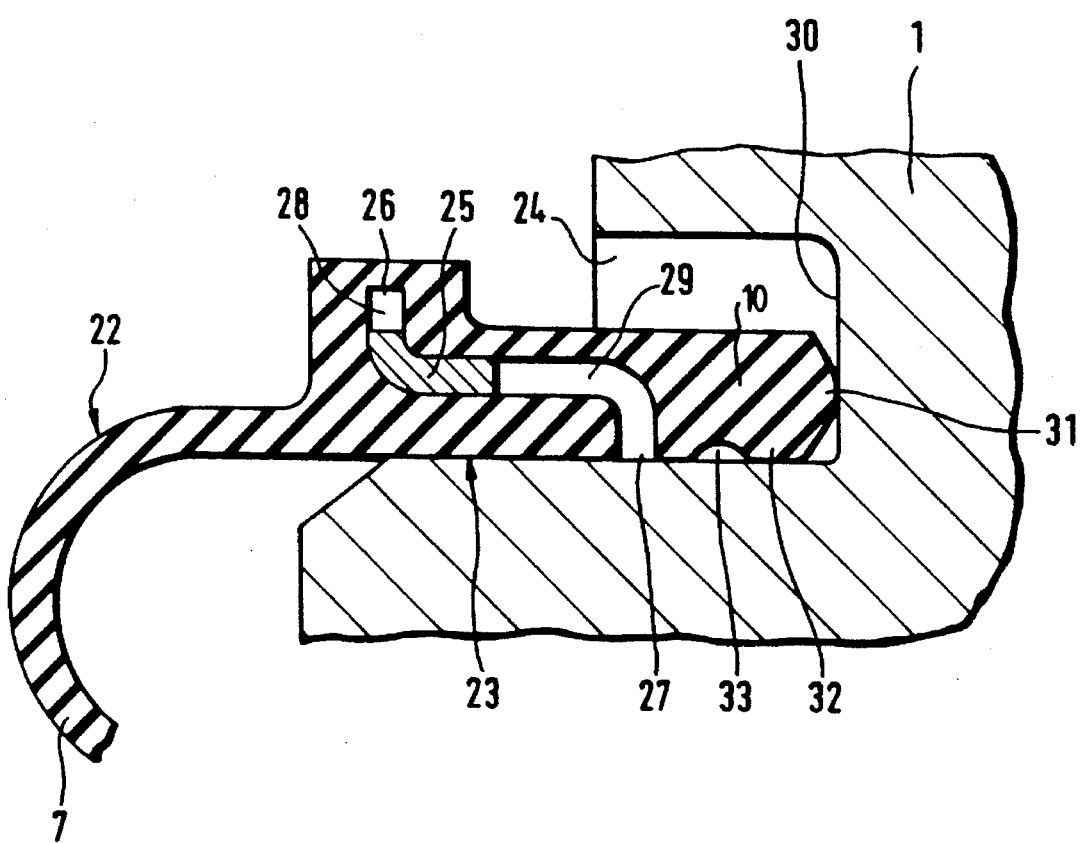
FIG. 6 shows a cross-section through the radially external end of the boot of a third design version of the inventive dust cover of the present invention.

FIG. 6 shows a design version of a dust cover 22 in which the radially external end 10 of the boot 7 which is configurated in the shape of a bag embraces from the outside a cylindrical wall 23 of a recess 24 which is constituted by a groove being cut in axial direction. The cylindrical ring 25 being embedded into said end 10 is formed with an outwardly bent rim 26 which is disposed inside the bag and with an inwardly bent rim 27 which projects out of the bag. Both rims 26, 27 are interrupted by cutouts 28, 29 which are positioned at a distance from one another in circumferential direction and into which the boot material penetrates completely or partially in the event of fabrication of the boot. The cutouts 29 in the rim 27 extend up into the cylindrical part of the ring 25, increasing in this manner the elasticity of the rim 27 in radial direction. The rim 27 can, therefore, be radially widened in the event of insertion of the end 10 of the dust cover 22 into the recess 24, so that in its position of incorporation it will firmly encircle the wall 23 and will safely retain the dust cover 22 within the recess 24 due to its frictional contact with the wall 23. The ring 25 is preferably made of an elastic metal, so that elevated clamping and retaining forces will allow to be achieved. Any problems regarding manufacturing inaccuracies as may creep up in case of a rubber-metal seat will, thus, allow to be avoided due to a direct metal contact between the ring 25 and the wall 23 of the brake cylinder 1.

Between the ring 25 and the bottom 30 of the recess 24, the end 10 of the boot 7 is provided with an axial sealing lip 31 which is in abutment against said bottom 30 and with a radial sealing lip 32 which encircles the wall 23. Between said sealing lip 32 and the rim 27 an undercutting 33 is envisaged in order that the sealing lip 32 may give way to prevent the shorning off of end 10 during the assembly process. Both sealing lips 31, 32 are positioned such that the sealing takes place in ranges of the recess 24 in which said recess 24 cannot be damaged by the pressing-in of the ring 25. In the case of the dust cover 22 the opening of the bag accommodating the ring 25 is positioned on the inner side of the boot 7 which is sealed off toward outside, so that the ring 25, too, is protected against influences from outside. The portion of the end 10 which is stiffened by the rim 26 serves for applying an assembly tool, the pressing-in force being transmitted to the ring 25 through the rubber material of the dust cover 22.

We claim:

1. A dust boot for the piston of a disk brake cylinder of a disk brake, the piston having an annular groove and the cylinder having an inside wall, said dust boot comprising:

a first end and a second end;

a fixing torus at said first end which is adapted to engage the annular groove in the piston of the brake cylinder;

a unilaterally open, ring-shaped bag at said second end; and means for transferring shearing forces which occur during installation of said dust boot through a stiffening lining in the shape of a ring received within said bag and at least partly surrounded by material of said boot, said ring formed with perforations which are penetrated by said material of said boot to retain said ring within said bag, wherein said ring urges said second end of said boot against said wall of said brake cylinder, a rim of said ring projecting from said bag to provide an abutment surface.

2. A dust cover as claimed in claim 1, wherein said rim of said ring which projects from said bag is adapted to abut with prestress against said wall of said recess within said brake cylinder.

3. A dust cover as claimed in claim 2, wherein said rim of the said ring is bent radially and is interrupted by cutouts which are spaced from one another.

4. A dust cover as claimed in claim 1, wherein said ring is made of stainless steel.

5. A dust cover as claimed in claim 1, wherein said ring is made of a thermoplastic synthetic material.

6. A dust cover as claimed in claim 1, wherein said rim of said ring projecting out of said bag has a radial collar which allows said ring to be urged in an axial direction against a stop surface at said brake cylinder.

7. A dust cover as claimed in claim 1, wherein the outer surface of said ring-shaped bag which is in abutment against said wall of said recess of said brake cylinder is furnished with a sealing bead or with a sealing lip.

8. A dust boot as recited in claim 1, wherein said rim of said ring is roughly parallel to a front side of said brake cylinder.

9. A dust boot as recited in claim 1, wherein said perforations comprise a plurality of similarly shaped openings.

* * * * *